US012131686B2

(12) United States Patent
Lee et al.

(10) Patent No.: US 12,131,686 B2
(45) Date of Patent: Oct. 29, 2024

(54) DISPLAY DEVICE HAVING A VOLTAGE PROVIDER FOR GENERATING A GATE-ON VOLTAGE AND A KICKBACK VOLTAGE

(71) Applicant: Samsung Display Co., Ltd., Yongin-Si (KR)

(72) Inventors: Sang Hyun Lee, Seongnam-si (KR); Si Duk Sung, Hwaseong-si (KR); Dae-Sik Lee, Hwaseong-si (KR)

(73) Assignee: Samsung Display Co., Ltd., Yongin-si (KR)

( * ) Notice: Subject to any disclaimer, the term of this patent is extended or adjusted under 35 U.S.C. 154(b) by 0 days.

(21) Appl. No.: 16/898,439

(22) Filed: Jun. 11, 2020

(65) Prior Publication Data

US 2021/0166616 A1 Jun. 3, 2021

(30) Foreign Application Priority Data

Nov. 28, 2019 (KR) ........................ 10-2019-0155879

(51) Int. Cl.
*G09G 3/32* (2016.01)

(52) U.S. Cl.
CPC ....... *G09G 3/32* (2013.01); *G09G 2310/0205* (2013.01); *G09G 2310/066* (2013.01)

(58) Field of Classification Search
CPC ............. G09G 3/32; G09G 2310/0205; G09G 2310/066; G09G 3/2085; G09G 3/2074; G09G 2310/0267; G09G 2310/08; G09G 2310/0264; G09G 2310/027; G09G 2310/06; G09G 2320/0219; G09G 2320/0247
See application file for complete search history.

(56) References Cited

U.S. PATENT DOCUMENTS

2008/0170064 A1* 7/2008 Lee ...................... G09G 3/3677 345/214
2016/0343341 A1* 11/2016 Kwak ................. G09G 3/3677

FOREIGN PATENT DOCUMENTS

| | | | |
|---|---|---|---|
| KR | 10-0495801 | B1 | 9/2005 |
| KR | 10-0840317 | B1 | 6/2008 |
| KR | 10-2008-0066392 | A | 7/2008 |
| KR | 10-2014-0076062 | A | 6/2014 |
| KR | 10-2016-0137866 | A | 12/2016 |

* cited by examiner

*Primary Examiner* — Stephen G Sherman
(74) *Attorney, Agent, or Firm* — Innovation Counsel LLP

(57) ABSTRACT

The current disclosure relates to a display device including a display panel including a plurality of pixels, and a plurality of gate lines and a plurality of data lines connected to the plurality of pixels, a gate driver applying a gate signal to the plurality of gate lines, a data driver applying a data signal to the plurality of data lines, and a voltage provider configured to generate a gate-on voltage that is gradually changed in one frame and a kickback voltage that is gradually changed in one frame to transmit the gate-on voltage and the kickback voltage to the gate driver.

11 Claims, 12 Drawing Sheets

DISPLAY DEVICE HAVING A VOLTAGE PROVIDER FOR GENERATING A GATE-ON VOLTAGE AND A KICKBACK VOLTAGE

CROSS-REFERENCE TO RELATED APPLICATION

This application claims priority to and the benefit of Korean Patent Application No. 10-2019-0155879 filed in the Korean Intellectual Property Office on Nov. 28, 2019, the entire contents of which are incorporated herein by reference.

BACKGROUND

1. Field

The present disclosure relates to a display device. More particularly, the present disclosure relates to a display device that may reduce a change in a data voltage charged in a pixel.

2. Description of the Related Art

A display device is used for displaying an image, and typically includes a liquid crystal display (LCD), an organic light emitting diode (OLED) display, and the like. The display device is used in various electronic devices such as a mobile phone, a navigation device, a digital camera, an electronic book, a portable game machine, and various hand-held terminals.

Generally, the display device may comprise a display panel including a plurality of pixels, a plurality of gate lines, and a plurality of data lines connected to the plurality of pixels. Each pixel may be connected to a gate line and a data line through a switching element. A predetermined gate signal may be applied to the plurality of gate lines. When the gate signal is changed from a gate-off voltage to a gate-on voltage, the switching element is turned on in response to activation of the gate signal, thereby charging the pixel by the data signal applied to the data line. Subsequently, when the gate signal is changed from a gate-on voltage to a gate-off voltage, the switching element is turned off in response to deactivation of the gate signal, and thus the pixel is not charged.

When the gate-off voltage is applied, the data voltage charged in the pixel is lowered due to parasitic capacitance, so that a desired screen cannot be displayed. In order to solve this problem, a kickback circuit is applied to drop the gate signal to a kickback voltage that is higher than the gate-off voltage before the gate-off voltage is applied, and then the gate-off voltage is applied, thus it is possible to reduce a change in the data voltage.

When the gate signal is applied to the display panel, the gate-on voltage is lowered and transmitted as a distance from which the gate signal is applied increases. Therefore, the switching elements disposed in some rows may not be turned on, or pixels may not be properly charged. In order to ameliorate this phenomenon, a method of gradually increasing and applying a gate-on voltage in one frame may be considered.

However, when the gate-on voltage gradually increases and is applied within one frame, an effect of applying the kickback circuit is relatively low. That is, in a state in which the gate signal does not fall to a desired kickback voltage, the gate-off voltage is applied, so that the data voltage charged in the pixel may decrease.

The above information disclosed in this Background section is only for enhancement of understanding of the background of the described technology, and therefore it may contain information that does not form the prior art that is already known in this country to a person of ordinary skill in the art.

SUMMARY

An embodiment of the present disclosure provides a display device that may reduce a change in a data voltage charged in a pixel.

An embodiment of the present disclosure provides a display device including a display panel including a plurality of pixels, and a plurality of gate lines and a plurality of data lines connected to the plurality of pixels; a gate driver applying a gate signal to the plurality of gate lines; a data driver applying a data signal to the plurality of data lines; and a voltage provider configured to generate a gate-on voltage that is gradually changed in one frame and a kickback voltage that is gradually changed in one frame to transmit the gate-on voltage and the kickback voltage to the gate driver, wherein the gate-on voltage may gradually increase and be applied to the plurality of gate lines from one of the plurality of gate lines having a shortest distance in which the gate signal is applied to one of the plurality of gate lines having a longest distance in which the gate signal is applied, the kickback voltage may gradually decrease and be applied to the plurality of gate lines from one of the plurality of gate lines having a shortest distance in which the gate signal is applied to one of the plurality of gate lines having a longest distance in which the gate signal is applied, and a change amount of the gate-on voltage within one frame may be proportional to a change amount of the kickback voltage within one frame.

The change amount of the gate-on voltage within one frame may be constant, and a ratio of the change amount of the kickback voltage within one frame to the change amount of the gate-on voltage within one frame may be adjustable.

The change amount of the kickback voltage within one frame may be constant, and a ratio of the change amount of the gate-on voltage within one frame to the change amount of the kickback voltage within one frame may be adjustable.

The plurality of gate lines may include a first gate line to an n-th gate line, a distance in which the gate signal is applied may gradually increase from the first gate line to the n-th gate line, the gate signal may be sequentially applied from the first gate line to the n-th gate line, the gate-on voltage, which gradually increases, may be applied within one frame, and the kickback voltage, which gradually decreases, may be applied within one frame.

The plurality of gate lines may include a first gate line to an n-th gate line; a distance in which the gate signal is applied may gradually increases from the first gate line to the n-th gate line; the gate signal is sequentially applied from the n-th gate line to the first gate line; the gate-on voltage, which gradually decreases, may be applied within one frame; and the kickback voltage, which gradually increases, may be applied within one frame.

A kickback time in which the kickback voltage is applied may be equal to each gate line.

A kickback time in which the kickback voltage is applied may be different for at least one of the plurality of gate lines.

The plurality of gate lines may include a first gate line to an n-th gate line, and the kickback time may gradually increase or decreases from the first gate line to the n-th gate line.

A change amount of the kickback time may be adjustable.

The plurality of gate lines may include a first gate line to an n-th gate line; the kickback time may be constantly maintained from the first gate line to a p-th gate line; and the kickback time may gradually increase or decrease from the p-th gate line to the n-th gate line.

The change amount of the kickback time and a value of p may be adjustable.

The plurality of gate lines may include a first gate line to an n-th gate line; the kickback time may be constantly maintained from the first gate line to a p-th gate line; and the kickback time may gradually increase or decrease from the p-th gate line to a q-th gate line.

The change amount of the kickback time and values of p and q may be adjustable.

Another embodiment of the present disclosure provides a display device including a display panel including a plurality of pixels, and a plurality of gate lines and a plurality of data lines connected to the plurality of pixels; a gate driver applying a gate signal to the plurality of gate lines; a data driver applying a data signal to the plurality of data lines; and a voltage provider configured to generate a gate-on voltage that is gradually changed in one frame and a kickback voltage that is gradually changed in one frame to transmit the gate-on voltage and the kickback voltage to the gate driver, wherein the gate-on voltage may gradually increase and applied to the plurality of gate lines from one of the plurality of gate lines having a shortest distance in which the gate signal is applied to one of the plurality of gate lines having a longest distance in which the gate signal is applied; and a kickback time in which the kickback voltage is applied may be different for at least one of the plurality of gate lines.

A same amount of the kickback voltage may be applied to the plurality of gate lines.

The plurality of gate lines may include a first gate line to an n-th gate line, and the kickback time may gradually increase or decrease from the first gate line to the n-th gate line.

A change amount of the kickback time may be adjustable.

Another embodiment of the present disclosure provides a display device including a display panel including a plurality of pixels, and a plurality of gate lines and a plurality of data lines connected to the plurality of pixels; a gate driver applying a gate signal to the plurality of gate lines; a data driver applying a data signal to the plurality of data lines; and a voltage provider that generates a gate-on voltage that is changed in one frame and a kickback voltage that is changed in one frame to transmit the gate-on voltage and the kickback voltage to the gate driver, wherein the plurality of gate lines may be divided into a plurality of sections, and the gate-on voltages applied to the gate lines respectively disposed at a start point of a first section of the plurality of sections, at a boundary point between the plurality of sections, and at an end point of a last section of the plurality of sections, may be pre-settable; while the plurality of gate lines may be divided into a plurality of sections, and the kickback voltages applied to the gate lines respectively disposed at a start point of a first section of the plurality of sections, at a boundary point between the plurality of sections, and at an end point of a last section of the plurality of sections, may be pre-settable.

The gate-on voltage may be gradually changed within each of the plurality of sections.

The kickback voltage may be gradually changed within each of the plurality of sections.

According to the embodiments, it is possible to reduce a change in a data voltage charged in a pixel by adjusting a gate-on voltage, a kickback voltage, and the like according to a position of a gate line.

BRIEF DESCRIPTION OF THE DRAWINGS

The above and other features and advantages of the present disclosure will become more apparent by describing in detailed example embodiments thereof with reference to the accompanying drawings, in which.

DETAILED DESCRIPTION

Figure 1:
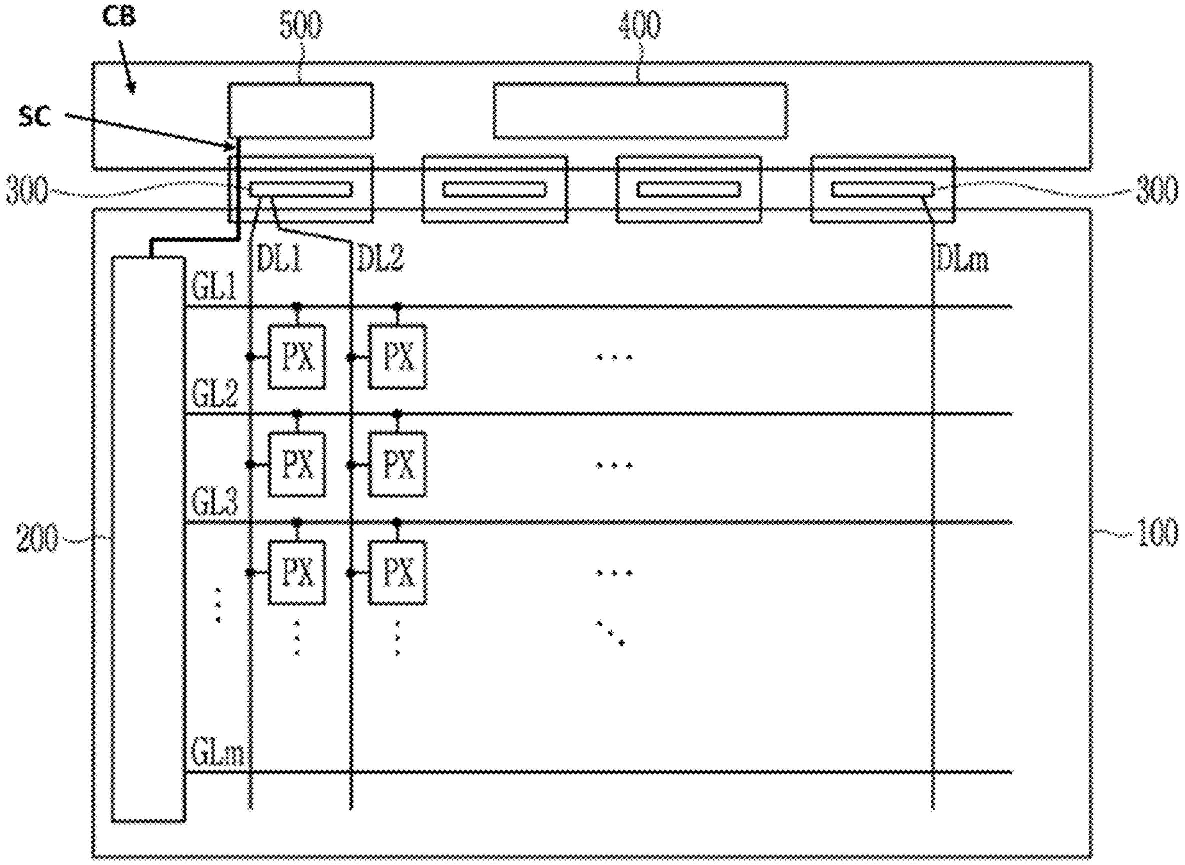
FIG. 1 illustrates a schematic view of a display device according to an embodiment.

The present disclosure will be described more fully hereinafter with reference to the accompanying drawings, in which embodiments of the invention are shown. As those skilled in the art would realize, the described embodiments may be modified in various different ways, all without departing from the spirit or scope of the present disclosure.

Parts that are irrelevant to the description will be omitted to clearly describe the present disclosure, and like reference numerals designate like elements throughout the specification.

Further, in the drawings, the size and thickness of each element are arbitrarily illustrated for ease of description, and the present disclosure is not necessarily limited to those illustrated in the drawings. In the drawings, the thicknesses of layers, films, panels, areas, regions, etc., are exaggerated for clarity. In the drawings, for ease of description, the thicknesses of some layers and areas are exaggerated.

It will be understood that when an element such as a layer, film, region, or substrate is referred to as being "on" another element, it can be directly on the other element or intervening elements may also be present. In contrast, when an element is referred to as being "directly on" another element, there are no intervening elements present. Further, in the specification, the word "on" or "above" means disposed on or below the object portion, and does not necessarily mean disposed on the upper side of the object portion based on a gravitational direction.

In addition, unless explicitly described to the contrary, the word "comprise" and variations such as "comprises" or "comprising" will be understood to imply the inclusion of stated elements but not the exclusion of any other elements.

Further, throughout the specification, the phrase "in a plan view" means viewing a target portion from the top, and the phrase "in a cross-sectional view" means viewing a cross-section formed by vertically cutting a target portion from the side.

FIG. 1 illustrates a schematic view of a display device according to an embodiment.

As depicted in FIG. 1, the display device according to the embodiment comprises a display panel 100 that includes a plurality of pixels PX, a plurality of gate lines GL1-GLn, a plurality of data lines DL1-DLm connected to the plurality of pixels PX, a gate driver 200 for applying a gate signal to the gate lines GL1-GLn, and a data driver 300 for applying a data signal to the data lines DL1-DLm.

The plurality of pixels PX may be arranged in a matrix form. However, the structure in which the pixels PX are arranged is only one example, and the structure of the pixels PX may be variously changed. The plurality of pixels PX may be connected to the gate lines GL1-GLn and the data lines DL1-DLm through a switching element such as a thin film transistor (not shown).

The plurality of gate lines GL1-GLn may be formed to extend along a horizontal direction. The plurality of gate lines GL1-GLn may include a first gate line GL1, a second gate line GL2, and a third gate lines GL3 to an n-th gate line GLn sequentially disposed from an upper edge of the display panel 100. The pixels PX disposed in a first row may be connected to the first gate line GL1, and the pixels PX disposed in a second row may be connected to the second gate line GL2. The pixels PX disposed in a third row may be connected to the third gate line GL3, and the pixels PX disposed in an n-th row may be connected to the n-th gate line GLn.

The plurality of data lines DL1-DLm may be formed to extend along a vertical direction. The plurality of data lines DL1-DLm may include a first data line DL1, a second data line DL2, an m-th data line DLm that are sequentially arranged from a left edge to a right edge of the display panel 100. The pixels PX disposed in a first column may be connected to the first data line DL1, the pixels PX disposed in a second column may be connected to the second data line DL2, and the pixels PX disposed in an m-th column may be connected to the m-th data line DLm.

The display panel 100 may be formed as various display panels such as an organic light emitting display panel, a liquid crystal display panel, an electrophoretic display panel, and an electro wetting display panel. In addition, the display panel 100 may be formed as next-generation display panels such as a micro LED display panel, a quantum dot light emitting diode (QLED) display panel, and a quantum dot organic light emitting diode (QD-OLED) display panel.

The gate driver 200 is connected to the plurality of gate lines GL1-GLn. The gate driver 200 may sequentially apply a gate signal to the plurality of gate lines GL1-GLn. For example, the gate signal may be first applied to the first gate line GL1, the gate signal may be applied to the second gate line GL2, and then the gate signal may be applied to the n-th gate line GLn at an end of one frame. However, this is only an example, and the gate signal may be first applied to the n-th gate line GLn, and then the gate signal may be applied to the first gate line GL1 at an end of one frame.

The gate signal may include a gate-on voltage VGH, a kickback voltage VKB, and a gate-off voltage VGL. The kickback voltage VKB may be between the gate-on voltage VGH and the gate-off voltage VGL. When the gate-on voltage VGH is applied to the gate lines GL1-GLn, as a gate output voltage of the gate lines GL1-GLn increases, the pixel PX connected to the corresponding gate lines GL1-GLn may be charged with a predetermined data voltage. Then, when the kickback voltage VKB is applied to the gate lines GL1-GLn, the gate output voltage of the gate lines GL1-GLn decreases. Subsequently, when the gate-off voltage VGL is applied to the gate lines GL1-GLn, the gate output voltage of the gate lines GL1-GLn is further lowered, and a switching element connected to the corresponding gate lines GL1-GLn is turned off.

The gate driver 200 may be disposed at one edge of the display panel 100. For example, the gate driver 200 may be directly formed on a substrate of the display panel 100 by an amorphous silicon gate (ASG) method or an oxide silicon gate (OSG) method. However, this is merely an example, and the gate driver 200 may be disposed at both edges of the display panel 100. In addition, the gate driver 200 may be mounted on a flexible printed circuit board (FPCB) by a chip on film (COF) manner and electrically connected to the display panel 100 through the flexible printed circuit board.

The display device according to the embodiment may further include a circuit board CB comprising a voltage provider 500 and a signal channel connecting the voltage provider 500 to the gate driver 200. The voltage provider 500 generates the gate-on voltage VGH, the kickback voltage VKB, and the gate-off voltage VGL, and transmits the gate-on voltage VGH, the kickback voltage VKB, and the gate-off voltage VGL to the gate driver 200 through the signal channel between the voltage provider 500 and the gate driver 200. In the present embodiment, the gate-on voltage VGH and the kickback voltage VKB may have different values depending on positions of the gate lines GL1-GLn. The values of the gate-on voltage VGH and the kickback voltage VKB will be described later with reference to FIG. 2 to FIG. 4.

The data driver 300 is connected to the plurality of data lines DL1-GLn. The data driver 300 may apply a data signal to the plurality of data lines DL1-DLm. The data driver 300 may be mounted on a flexible printed circuit board (FPCB) by a chip on film (COF) manner and electrically connected to the display panel 100 through the flexible printed circuit board.

The display device according to the embodiment may further include a signal controller 400. The signal controller 400 may receive an image signal from the outside and control signals for controlling display of the image signal, for example, a vertical synchronization signal, a horizontal synchronization signal, a main clock signal, and a data enable signal. The signal controller 400 may process an image signal based on the control signals according to an operating condition of the display panel 100 and apply a data signal, a data control signal, etc. to the data driver 300, and apply a gate control signal to the gate driver 200. The data control signal may include a horizontal synchronization start signal, a clock signal, a line latch signal, and the like, and the gate control signal may include a gate start signal, a gate clock signal, an output enable signal, and the like.

Hereinafter, the display device according to the embodiment will be further described with reference to FIG. 2 to FIG. 4.

Figure 2:
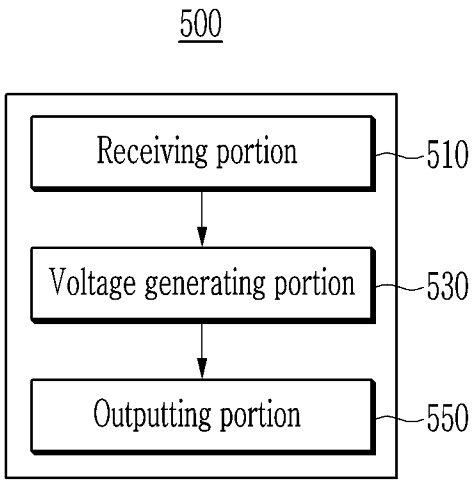
FIG. 2 illustrates a block diagram of a voltage providing portion of a display device according to an embodiment.
Figure 3:
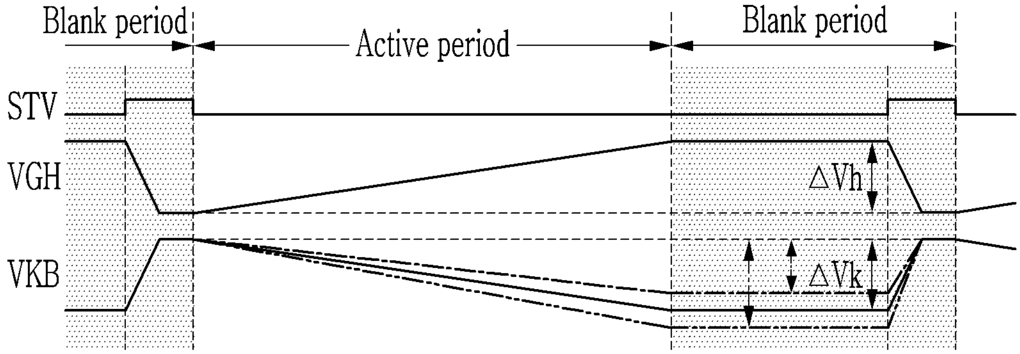
FIG. 3 illustrates a timing diagram of a gate signal generated in a display device according to an embodiment.
Figure 4:
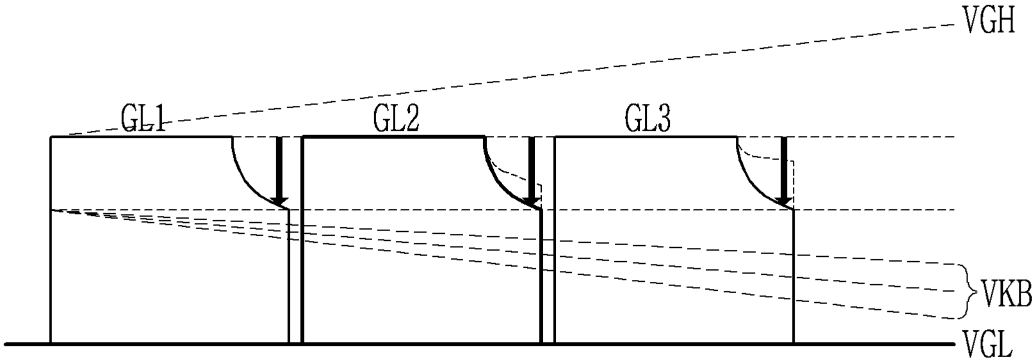
FIG. 4 illustrates a gate output voltage outputted to some of gate lines of a display device according to an embodiment.

FIG. 2 illustrates a block diagram of a voltage provider of the display device according to the embodiment, FIG. 3 illustrates a timing diagram of a gate signal generated in the display device according to the embodiment, and FIG. 4 illustrates a gate output voltage outputted to some gate lines of the display device according to the embodiment.

As shown in FIG. 2, the voltage provider 500 of the display device according to the embodiment may include a receiving portion 510 that receives a signal from the outside, a voltage generating portion 530 that generates the gate-on voltage VGH, the kickback voltage VKB, and the gate-off voltage VGL, and an outputting portion 550 that transmits the generated voltages to the gate driver 200.

As shown in FIG. 3, when the gate start signal STV is applied, one frame begins to enter an active period. The gate-on voltage VGH may be applied to each of the gate lines GL1-GLn. The gate-on voltage VGH may be gradually changed within one frame. In this manner, the gate-on voltage VGH may gradually increase and be applied to the gate lines GL1-GLn from one of the gate lines GL1-GLn having the shortest distance in which the gate signal is applied to one of the gate lines GL1-GLn having the longest distance in which the gate signal is applied.

For example, the first gate line GL1 may be at the shortest distance in which the gate signal is applied, and the n-th gate line GLn may be at the longest distance in which the gate signal is applied. In this manner, the gate-on voltage VGH applied to the first gate line GL1 may have the lowest value, and the gate-on voltage VGH applied to the second gate line GL2 may be higher than that applied to the first gate line GL1. In addition, the gate-on voltage VGH applied to the third gate line GL3 may be higher than that applied to the second gate line GL2. Further, the gate-on voltage VGH applied to the n-th gate line GLn may have the highest value.

For example, the gate signal may be first applied to the first gate line GL1, the gate signal may be applied to the second gate line GL2, and then the gate signal may be applied to the n-th gate line GLn at an end of one frame. In this manner, the outputting portion 550 of the voltage provider 500 may first output the lowest gate-on voltage VGH, and sequentially output the gate-on voltages VGH that gradually increase. The outputting portion 550 of the voltage provider 500 may output the highest gate-on voltage VGH at the end.

The gate-on voltage VGH applied to each of the gate lines GL1-GLn may have a predetermined value. Therefore, a change amount ΔVh of the gate-on voltage VGH may be constant within one frame. The change amount ΔVh of the gate-on voltage VGH within one frame means a difference between the gate-on voltage VGH applied to the first gate line GL1 and the gate-on voltage VGH applied to the n-th gate line GLn. For example, the change amount ΔVh of the gate-on voltage VGH may be about 5 V.

In addition, the kickback voltage VKB may be applied to each of the gate lines GL1-GLn. The kickback voltage VKB may be gradually changed within one frame. In this manner, the kickback voltage VKB may gradually decrease and be applied to the gate lines GL1-GLn from one of the gate lines GL1-GLn having the shortest distance in which the gate signal is applied to one of the gate lines GL1-GLn having the longest distance in which the gate signal is applied.

For example, the first gate line GL1 may be at the shortest distance in which the gate signal is applied, and the n-th gate line GLn may be at the longest distance in which the gate signal is applied. In this manner, the kickback voltage VKB applied to the first gate line GL1 may have the highest value, and the kickback voltage VKB applied to the second gate line GL2 may be lower than that applied to the first gate line GL1. In addition, the kickback voltage VKB applied to the third gate line GL3 may be lower than that applied to the second gate line GL2. Further, the kickback voltage VKB applied to the n-th gate line GLn may have the lowest value.

For example, the gate signal may be first applied to the first gate line GL1, the gate signal may be applied to the second gate line GL2, and then the gate signal may be applied to the n-th gate line GLn at an end of one frame. In this manner, the outputting portion 550 of the voltage provider 500 may first output the highest kickback voltage VKB, and sequentially output the kickback voltage VKB that gradually decreases. The outputting portion 550 of the voltage provider 500 may output the lowest kickback voltage VKB at the end.

The kickback voltage VKB applied to each of the gate lines GL1-GLn may be adjustable. Therefore, a change amount ΔVk of the kickback voltage VKB may be adjusted within one frame. The change amount ΔVk of the kickback voltage VKB within one frame means a difference between the kickback voltage VKB applied to the first gate line GL1 and the kickback voltage VKB applied to the n-th gate line GLn. The change amount ΔVh of the gate-on voltage VGH within one frame may be proportional to the change amount ΔVk of the kickback voltage VKB within one frame. The change amount ΔVk of the kickback voltage VKB within one frame may be determined by Equation 1.

$$\Delta Vk = \alpha \Delta Vh \qquad \text{(Equation 1)}$$

That is, the change amount ΔVk of the kickback voltage VKB within one frame may be a times the change amount ΔVh of the gate-on voltage VGH within one frame. In this manner, a may be any number which is greater than 0 and less than 2. The ratio a of the change amount ΔVk of the kickback voltage VKB within one frame to the change amount ΔVh of the gate-on voltage VGH within one frame is adjustable. The receiving portion 510 of the voltage provider 500 may receive the ratio a of the change amount ΔVk of the kickback voltage VKB within one frame to the change amount ΔVh of the gate-on voltage VGH within one frame from the outside. According to the ratio, the kickback voltage VKB applied to each of the gate lines GL1-GLn may be calculated and generated.

For example, the change amount ΔVh of the gate-on voltage VGH may be about 5 V. In this manner, the change amount ΔVk of the kickback voltage VKB may be about 5 V. In addition, the change amount ΔVk of the kickback voltage VKB may be changed according to the α value inputted to the receiving portion 510 of the voltage provider 500. For example, the change amount ΔVk of the kickback voltage VKB may be about 4 V or about 6 V. That is, by appropriately inputting the a value as necessary, the change amount ΔVk of the kickback voltage VKB may be adjusted.

As shown in FIG. 4, the gate signal may be sequentially applied to the gate lines GL1-GLn. FIG. 4 shows the gate output voltages outputted to some of the gate lines GL1-GLn, for example, the first gate line GL1, the second gate line GL2, and the third gate line GL3.

The lowest gate-on voltage VGH may be applied to the first gate line GL1 having the shortest distance in which the gate signal is applied, and the gate voltage VGH that gradually increases is sequentially applied to the second gate line GL2 and the third gate line GL3. As the distance in which the gate signal is applied gradually increases from the first gate line GL1 to the n-th gate line GLn, a voltage drop occurs. In the display device according to the embodiment, since the gate-on voltage VGH that gradually increases from the first gate line GL1 to the n-th gate line GLn is applied, even if a voltage drop occurs, the gate output voltage of each of the gate lines GL1-GLn may have a constant value.

In addition, the highest kickback voltage VKB may be applied to the first gate line GL1 having the shortest distance in which the gate signal is applied, and the kickback voltage VKB that gradually decreases is sequentially applied to the second gate line GL2 and the third gate line GL3. When a constant kickback voltage VKB is applied to each of the gate lines GL1-GLn, the gate output voltage of each of the gate lines GL1-GLn may not sufficiently drop as indicated by a dotted line. That is, as the distance in which the gate signal is applied increases, an effect of applying a kickback circuit is relatively reduced. In the display device according to the embodiment, since the kickback voltage VKB that gradually decreases from the first gate line GL1 to the n-th gate line GLn is applied, the gate output voltage of each of the gate lines GL1-GLn may sufficiently drop as indicated by the solid line. Therefore, even if the gate-off voltage VGL is applied to each of the gate lines GL1-GLn, it is possible to reduce an amount at which the data voltage charged in the pixel PX drops. That is, it is possible to reduce a change in the data voltage charged in the pixel.

Hereinafter, a display device according to an embodiment will be described with reference to FIG. 5.

Figure 5:
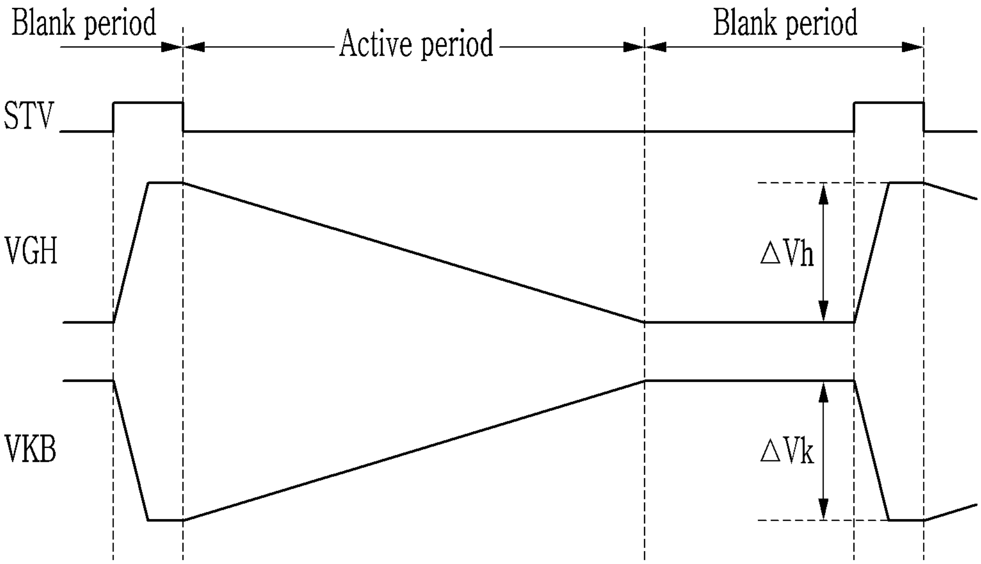
FIG. 5 illustrates a timing diagram of a gate signal generated in a display device according to an embodiment.

Since many portions of the display device according to the embodiment of FIG. 5 are e equal to those of the display device according to the embodiment of FIG. 1 to FIG. 4, a repeated description thereof will be omitted. In the present embodiment, an order in which the gate signals are applied is different from that of the previous embodiment, which will be further described below.

FIG. 5 illustrates a timing diagram of a gate signal generated in a display device according to an embodiment.

As in the previous embodiment, the gate-on voltage VGH may be applied to each of the gate lines GL1-GLn of the display device according to the embodiment. The gate-on voltage VGH may be gradually changed within one frame. In this manner, the gate-on voltage VGH may gradually increase and be applied to the gate lines GL1-GLn from one of the gate lines GL1-GLn having the shortest distance in which the gate signal is applied to one of the gate lines GL1-GLn having the longest distance in which the gate signal is applied. For example, the first gate line GL1 may be at the shortest distance in which the gate signal is applied, and the n-th gate line GLn may be at the longest distance in which the gate signal is applied.

In the present embodiment, the gate signal may be first applied to the n-th gate line GLn, and the gate signal may be applied to the first gate line GL1 at the end of one frame. In this manner, the outputting portion 550 of the voltage provider 500 may first output the highest gate-on voltage VGH, and sequentially output the gate-on voltages VGH that gradually decrease. The outputting portion 550 of the voltage provider 500 may output the lowest gate-on voltage VGH at the end.

In addition, the kickback voltage VKB may be applied to each of the gate lines GL1-GLn. The kickback voltage VKB may be gradually changed within one frame. In this manner, the kickback voltage VKB may gradually decrease and be applied to the gate lines GL1-GLn from one of the gate lines GL1-GLn having the shortest distance in which the gate signal is applied to one of the gate lines GL1-GLn having the longest distance in which the gate signal is applied. For example, the first gate line GL1 may be at the shortest distance in which the gate signal is applied, and the n-th gate line GLn may be at the longest distance in which the gate signal is applied.

In the present embodiment, the gate signal may be first applied to the n-th gate line GLn, and the gate signal may be applied to the first gate line GL1 at the end of one frame. In this manner, the outputting portion 550 of the voltage provider 500 may first output the lowest kickback voltage VKB, and sequentially output the kickback voltage VKB that gradually increases. The outputting portion 550 of the voltage provider 500 may output the highest kickback voltage VKB at the end.

Hereinafter, a display device according to an embodiment will be described with reference to FIG. 6.

Figure 6:
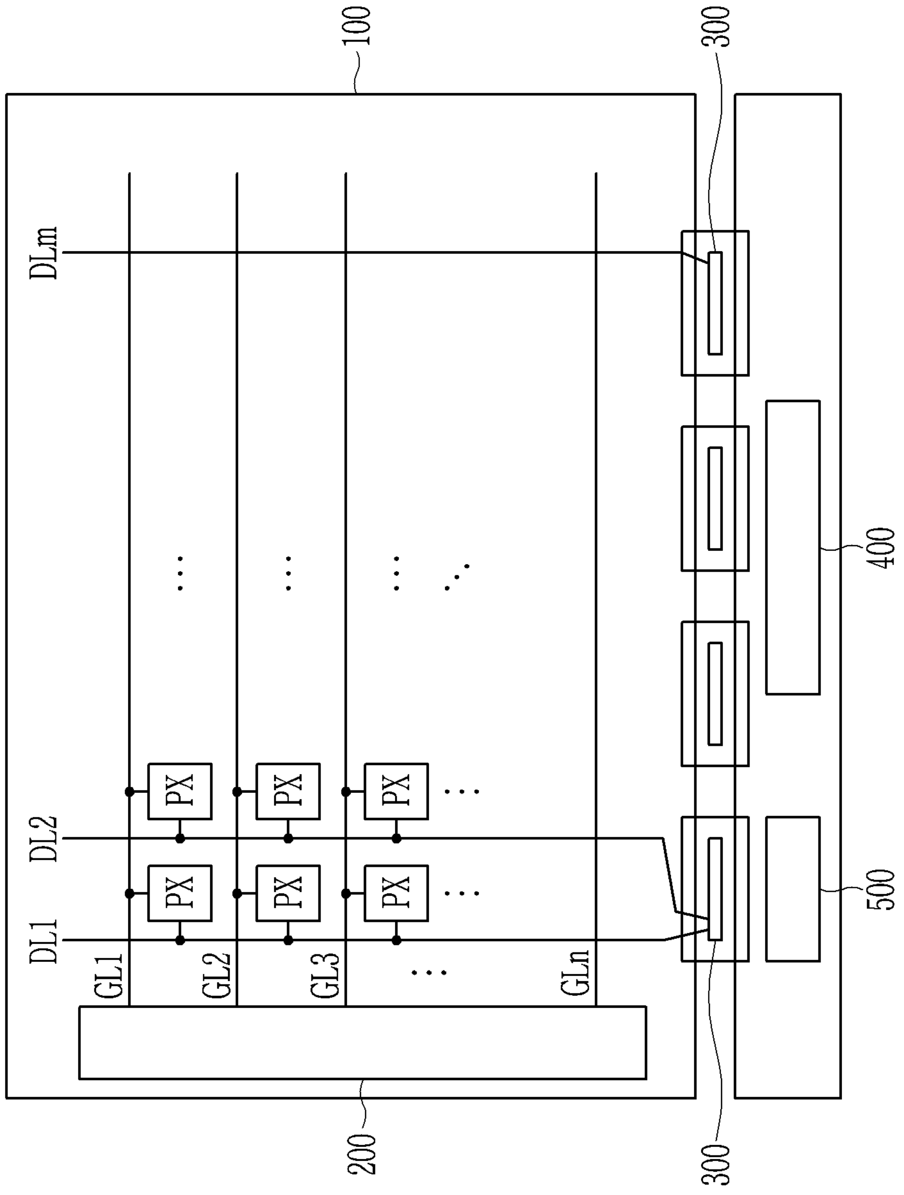
FIG. 6 illustrates a schematic view of a display device according to an embodiment.

Since many portions of the display device according to the embodiment of FIG. 6 are the same as those of the display device according to the embodiment of FIG. 1 to FIG. 4, a repeated description thereof will be omitted. The present embodiment is different from the previous embodiment in that the first gate line is at the longest distance in which the gate signal is applied, which will be described below.

FIG. 6 illustrates a schematic view of a display device according to an embodiment.

As in the previous embodiment, the gate-on voltage VGH may be applied to each of the gate lines GL1-GLn of the display device according to the embodiment. The gate-on voltage VGH may be gradually changed within one frame. In this manner, the gate-on voltage VGH may gradually increases and be applied to the gate lines GL1-GLn from one of the gate lines GL1-GLn having the shortest distance in which the gate signal is applied to one of the gate lines GL1-GLn having the longest distance in which the gate signal is applied.

In the present embodiment, the first gate line GL1 may be at the longest distance in which the gate signal is applied, and the n-th gate line GLn may be at the shortest distance in which the gate signal is applied. In this manner, the gate-on voltage VGH applied to the first gate line GL1 may have the highest value, and the gate-on voltage VGH applied to the second gate line GL2 may be lower than that applied to the first gate line GL1. In addition, the gate-on voltage VGH applied to the third gate line GL3 may be lower than that applied to the second gate line GL2. Further, the gate-on voltage VGH applied to the n-th gate line GLn may have the lowest value.

For example, the gate signal may be first applied to the first gate line GL1, the gate signal may be applied to the second gate line GL2, and then the gate signal may be applied to the n-th gate line GLn at an end of one frame. In this manner, the highest gate-on voltage VGH may be first outputted, and the gate-on voltages VGH that gradually decrease may be sequentially outputted. Finally, the lowest gate-on voltage VGH may be outputted.

However, this is merely an example, and an order of applying the gate signal may be changed. For example, the gate signal may be first applied to the n-th gate line GLn, and the gate signal may be applied to the first gate line GL1 at an end of one frame. In this manner, the lowest gate-on voltage VGH may be first outputted, and the gate-on voltages VGH that gradually increase may be sequentially outputted. Finally, the highest gate-on voltage VGH may be outputted.

In addition, the kickback voltage VKB may be applied to each of the gate lines GL1-GLn. The kickback voltage VKB may be gradually changed within one frame. In this manner, the kickback voltage VKB may gradually decrease and be applied to the gate lines GL1-GLn from one of the gate lines GL1-GLn having the shortest distance in which the gate signal is applied to one of the gate lines GL1-GLn having the longest distance in which the gate signal is applied.

In the present embodiment, the first gate line GL1 may be at the longest distance in which the gate signal is applied, and the n-th gate line GLn may be at the shortest distance in which the gate signal is applied. In this manner, the kickback voltage VKB applied to the first gate line GL1 may have the lowest value, and the kickback voltage VKB applied to the n-th gate line GLn may have the highest value.

For example, the gate signal may be first applied to the first gate line GL1, the gate signal may be applied to the second gate line GL2, and then the gate signal may be applied to the n-th gate line GLn at an end of one frame. In this manner, the lowest kickback voltage VKB may be first outputted, and the kickback voltage VKB that gradually increases may be sequentially outputted. Finally, the highest kickback voltage VKB may be outputted.

However, this is merely an example, and an order of applying the gate signal may be changed. For example, the gate signal may be first applied to the n-th gate line GLn, and the gate signal may be applied to the first gate line GL1 at an end of one frame. In this manner, the highest kickback voltage VKB may be first outputted, and the kickback voltage VKB that gradually decreases may be sequentially outputted. Finally, the lowest kickback voltage VKB may be outputted.

Hereinafter, a display device according to an embodiment will be described with reference to FIG. 7.

Figure 7:
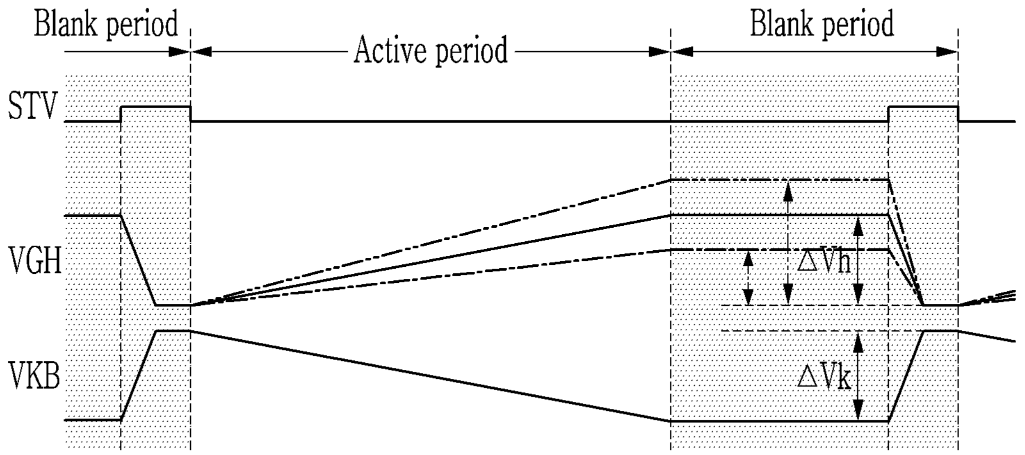
FIG. 7 illustrates a timing diagram of a gate signal generated in a display device according to an embodiment.

Since many portions of the display device according to the embodiment of FIG. 7 are equal to those of the display device according to the embodiment of FIG. 1 to FIG. 4, a repeated description thereof will be omitted. The present embodiment differs from the previous embodiment in that an amount of change in the gate-on voltage may be adjusted within one frame, which will be further described below.

FIG. 7 illustrates a timing diagram of a gate signal generated in a display device according to an embodiment.

As in the previous embodiment, the gate-on voltage VGH may be applied to each of the gate lines GL1-GLn of the display device according to the embodiment. The gate-on voltage VGH may be gradually changed within one frame. In this manner, the gate-on voltage VGH may gradually increase and be applied to the gate lines GL1-GLn from one of the gate lines GL1-GLn having the shortest distance in which the gate signal is applied to one of the gate lines GL1-GLn having the longest distance in which the gate signal is applied.

In addition, the kickback voltage VKB may be applied to each of the gate lines GL1-GLn. The kickback voltage VKB may be gradually changed within one frame. In this manner, the kickback voltage VKB may gradually decrease and be applied to the gate lines GL1-GLn from one of the gate lines GL1-GLn having the shortest distance in which the gate signal is applied to one of the gate lines GL1-GLn having the longest distance in which the gate signal is applied.

In the present embodiment, the kickback voltage VKB applied to each of the gate lines GL1-GLn may have a predetermined value. Therefore, a change amount $\Delta Vk$ of the kickback voltage VKB may be constant within one frame. The change amount $\Delta Vk$ of the kickback voltage VKB within one frame means a difference between the kickback voltage VKB applied to the first gate line GL1 and the kickback voltage VKB applied to the n-th gate line GLn.

In addition, the kickback voltage VKB applied to each of the gate lines GL1-GLn may be adjustable. Therefore, a change amount $\Delta Vh$ of the gate-on voltage VGH may be adjusted within one frame. The change amount $\Delta Vh$ of the gate-on voltage VGH within one frame means a difference between the gate-on voltage VGH applied to the first gate line GL1 and the gate-on voltage VGH applied to the n-th gate line GLn. The change amount $\Delta Vh$ of the gate-on voltage VGH within one frame may be proportional to the change amount $\Delta Vk$ of the kickback voltage VKB within one frame. The change amount $\Delta Vh$ of the gate-on voltage VGH within one frame may be determined by Equation 2.

$$\Delta Vh=\beta\Delta Vk \quad \text{(Equation 2)}$$

That is, the change amount $\Delta Vh$ of the gate-on voltage VGH within one frame may be $\beta$ times the change amount $\Delta Vk$ of the kickback voltage VKB within one frame. In this manner, $\beta$ may be any number which is greater than 0 and less than 2. The ratio $\beta$ of the change amount $\Delta Vh$ of the gate-on voltage VGH within one frame to the change amount $\Delta Vk$ of the kickback voltage VKB within one frame is adjustable. The receiving portion 510 of the voltage provider 500 may receive the ratio $\beta$ of the change amount $\Delta Vh$ of the gate-on voltage VGH within one frame to the change amount $\Delta Vk$ of the kickback voltage VKB within one frame from the outside. According to the ratio, the gate-on voltage VGH applied to each of the gate lines GL1-GLn may be calculated and generated.

It is explained above that the change amount $\Delta Vk$ of the kickback voltage VKB is constant within one frame and the change amount $\Delta Vh$ of the gate-on voltage VGH is adjustable within one frame, but the present disclosure is not limited thereto. The change amount $\Delta Vk$ of the kickback voltage VKB within one frame and the change amount $\Delta Vh$ of the gate-on voltage VGH within one frame may be respectively adjusted.

Hereinafter, a display device according to an embodiment will be described with reference to FIG. 8.

Figure 8:
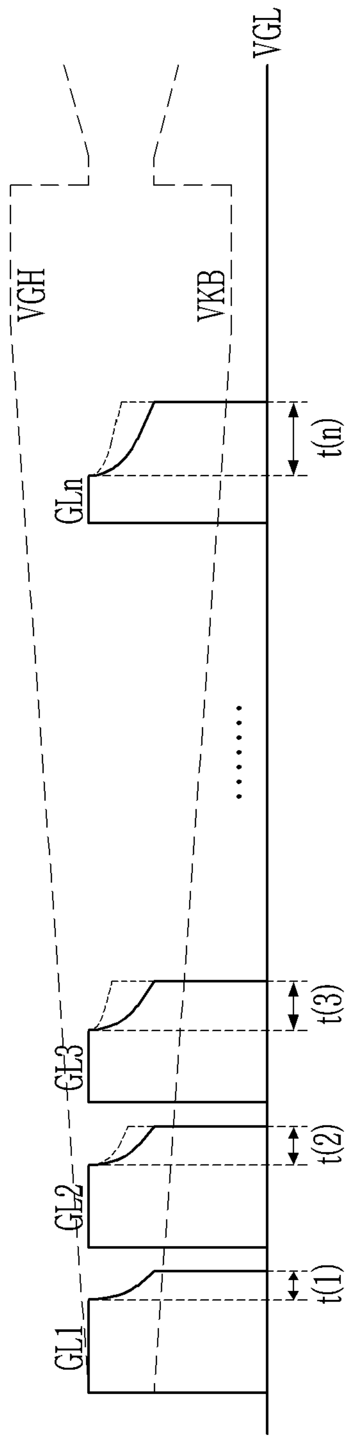
FIG. 8 illustrates a gate output voltage outputted to some of gate lines of a display device according to an embodiment.

Since many portions of the display device according to the embodiment of FIG. 8 are equal to those of the display device according to the embodiment of FIG. 1 to FIG. 4, a repeated description thereof will be omitted. The present embodiment is different from the previous embodiment in that a kickback time at which the kickback voltage is applied to each of the gate lines is different, which will be described below.

FIG. 8 illustrates a gate output voltage outputted to some of gate lines of a display device according to an embodiment.

As in the previous embodiment, the gate-on voltage VGH may be applied to each of the gate lines GL1-GLn of the display device according to the embodiment. The gate-on voltage VGH may be gradually changed within one frame. In this manner, the gate-on voltage VGH may gradually increase and be applied to the gate lines GL1-GLn from one of the gate lines GL1-GLn having the shortest distance in which the gate signal is applied to one of the gate lines GL1-GLn having the longest distance in which the gate signal is applied.

In addition, the kickback voltage VKB may be applied to each of the gate lines GL1-GLn. The kickback voltage VKB may be gradually changed within one frame. In this manner, the kickback voltage VKB may gradually decrease and be applied to the gate lines GL1-GLn from one of the gate lines GL1-GLn having the shortest distance in which the gate signal is applied to one of the gate lines GL1-GLn having the longest distance in which the gate signal is applied.

In the previous embodiment, the time in which the kickback voltage VKB is applied to each of the gate lines GL1-GLn may be the same. However, in the present embodiment, the time in which the kickback voltage VKB is applied to each of the gate lines GL1-GLn may be different. The kickback time at which the kickback voltage VKB is applied to each of the gate lines GL1-GLn may be determined by Equation 3 below.

$$t(i)=(1\pm(i-1)\gamma)tref \quad \text{(Equation 3)}$$

(t(i): kickback time of i-th gate line, tref: reference time)

The kickback voltage VKB may be applied to the first gate line GL1 for the reference time (tref). The kickback voltage VKB may be applied to the second gate line GL2 for a longer time ((1+γ)tref) than the reference time (tref). The kickback voltage VKB may be applied to the third gate line GL3 for a longer time ((1+2γ)tref) than the time ((1+γ)tref) for the second gate line GL2. The kickback voltage VKB may be applied to the n-th gate line GLn for the longest time ((1+(n-1)γ)tref). That is, the kickback time may gradually increase from the first gate line GL1 to the n-th gate line GLn.

In contrast, the kickback voltage VKB may be applied to the second gate line GL2 for a shorter time ((1−γtref) than the reference time (tref). The kickback voltage VKB may be applied to the third gate line GL3 for a shorter time ((1−2γ)tref) than the time ((1−γtref) for the second gate line GL2. The kickback voltage VKB may be applied to the n-th gate line GLn for the shortest time ((1−(n-1)γ)tref). That is, the kickback time may gradually decrease from the first gate line GL1 to the n-th gate line GLn.

In Equation 3, γ may be any number which is greater than 0 and less than 1. The value of γ may be adjusted. As shown in FIG. 2, the receiving portion 510 of the voltage provider 500 may receive the γ value related to the change amount of the kickback time from the outside.

In the present embodiment, when the gate output voltage does not sufficiently decrease, the gate output voltage may be adjusted to sufficiently decrease by increasing the kickback time in which the kickback voltage VKB is applied to each of the gate lines GL1-GLn. In contrast, when the gate output voltage excessively decreases, the gate output voltage may be adjusted to decrease only as much as desired by decreasing the kickback time in which the kickback voltage VKB is applied to each of the gate line GL1-GLn.

Hereinafter, a display device according to an embodiment will be described with reference to FIG. 9.

Figure 9:
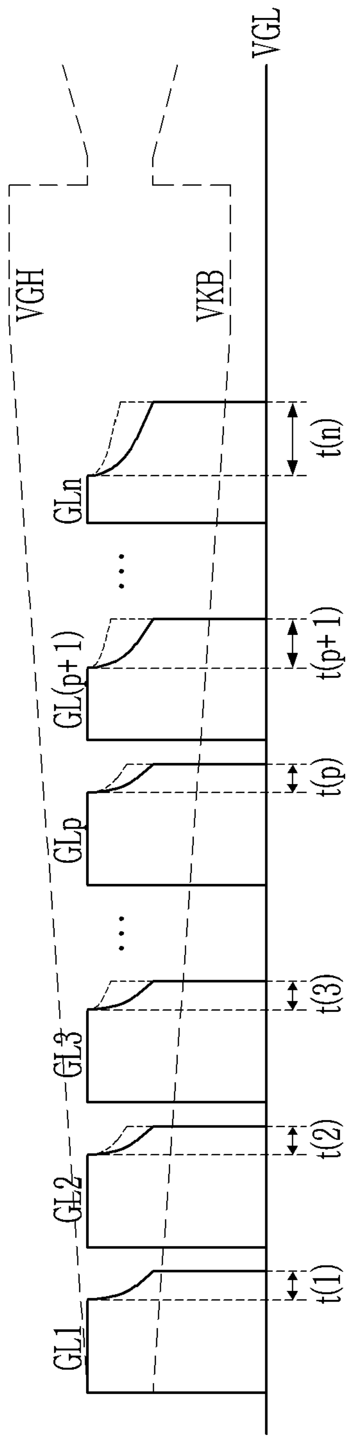
FIG. 9 illustrates a gate output voltage outputted to some of gate lines of a display device according to an embodiment.

Since many portions of the display device according to the embodiment of FIG. 9 are the same as those of the display device according to the embodiment of FIG. 8, a repeated description thereof will be omitted. The present embodiment differs from the previous embodiment in that the kickback time is kept constant and then the kickback time gradually increases from a gate signal applied to a predetermined gate line, which will be further described below.

FIG. 9 illustrates a gate output voltage outputted to some of gate lines of a display device according to an embodiment.

As in the previous embodiment, the gate-on voltage VGH may be applied to each of the gate lines GL1-GLn of the display device according to the embodiment. The gate-on voltage VGH may be gradually changed within one frame. In this manner, the gate-on voltage VGH may gradually increase and be applied to the gate lines GL1-GLn from one of the gate lines GL1-GLn having the shortest distance in which the gate signal is applied to one of the gate lines GL1-GLn having the longest distance in which the gate signal is applied.

In addition, the kickback voltage VKB may be applied to each of the gate lines GL1-GLn. The kickback voltage VKB may be gradually changed within one frame. In this manner, the kickback voltage VKB may gradually decrease and be applied to the gate lines GL1-GLn from one of the gate lines GL1-GLn having the shortest distance in which the gate signal is applied to one of the gate lines GL1-GLn having the longest distance in which the gate signal is applied.

In the previous embodiment, the kickback time may gradually increase from the first gate line GL1 to the n-th gate line GLn. In the present embodiment, the kickback time may be kept constant up to a predetermined gate line GL1-GLn, and the kickback time may increase after the predetermined gate line GL1-GLn. The kickback time at which the kickback voltage VKB is applied to each of the gate lines GL1-GLn may be determined by Equation 4 below.

$$t(i)=tref, i\le p$$

$$t(i)=(1\pm(i-p)\gamma)tref, i>p \quad \text{(Equation 4)}$$

(t(i): kickback time of i-th gate line, tref: reference time)

The kickback voltage VKB may be applied to the first gate line GL1 for the reference time (tref). The kickback voltage VKB may be applied to the second gate line GL2 and the third gate line GL3 for the reference time (tref). Similarly, the kickback voltage VKB may be applied to a p-th gate line for the reference time (tref) as in the first gate line GL1. That is, the kickback time may be constant from the first gate line GL1 to the p-th gate line.

The kickback voltage VKB may be applied to a (p+1)-th gate line for a longer time ((1+γ)tref) than the time for the p-th gate line. The kickback voltage VKB may be applied to a (p+2)-th gate line for a longer time ((1+2γ)tref) than the time for the (p+1)-th gate line. The kickback voltage VKB may be applied to the n-th gate line GLn for the longest time ((1+(n-p)γ)tref). That is, the kickback time may gradually increase from the p-th gate line to the n-th gate line GLn.

In contrast, the kickback voltage VKB may be applied to the (p+1)-th gate line for a shorter time ((1−γtref) than the time for the p-th gate line. The kickback voltage VKB may be applied to the (p+2)-th gate line for a shorter time ((1−2γ)tref) than the time for the (p+1)-th gate line. The kickback voltage VKB may be applied to the n-th gate line GLn for the shortest time ((1−(n-p)γ)tref). That is, the kickback time may gradually decrease from the p-th gate line to the n-th gate line GLn.

In Equation 4, γ may be any number which is greater than 0 and less than 1, and p may be any number which is greater than or equal to 2 and less than n. The values of γ and p may be adjusted. As shown in FIG. 2, the receiving portion 510 of the voltage provider 500 may receive the γ value related to the change amount of the kickback time and the p value indicating the number of the gate lines at which the change of the kickback time starts from the outside.

In the present embodiment, the gate output voltage is controlled from the first gate line to a predetermined gate line only by changing the kickback voltage VKB, and after the predetermined gate line, the gate output voltage is controlled by changing the kickback time together with the change of the kickback voltage VKB. That is, when the gate output voltage does not sufficiently decrease, the gate output voltage may be adjusted to sufficiently decrease by increasing the kickback time after the predetermined gate line. In contrast, when the gate output voltage excessively decreases, the gate output voltage may be adjusted to decrease only as much as desired by decreasing the kickback time after the predetermined gate line.

Hereinafter, a display device according to an embodiment will be described with reference to FIG. 10.

Figure 10:
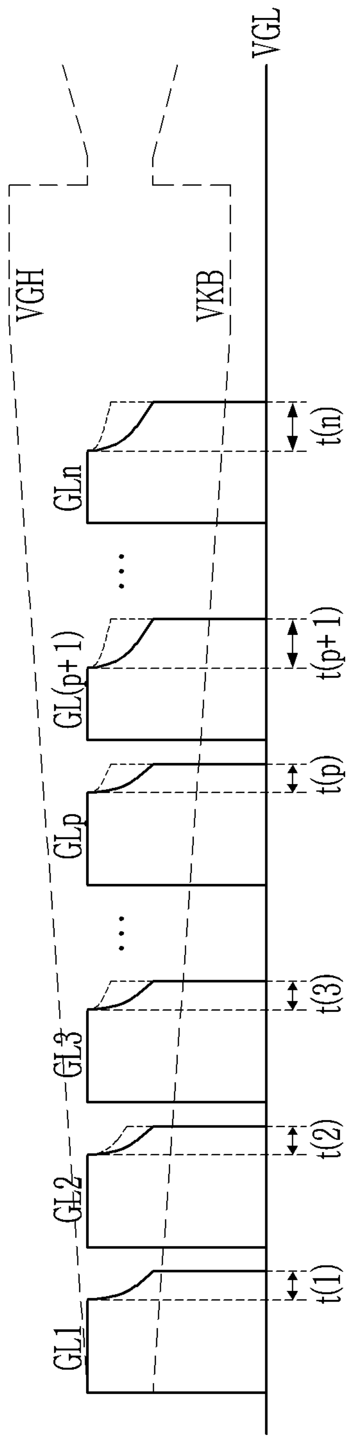
FIG. 10 illustrates a gate output voltage outputted to some of gate lines of a display device according to an embodiment.

Since many portions of the display device according to the embodiment of FIG. 10 are equal to those of the display device according to the embodiment of FIG. 9, a repeated description thereof will be omitted. The present embodiment is different from the previous embodiment in that the kickback time is kept constant and then the kickback time increases from a predetermined gate line and then the kickback time is kept constant again from another predetermined gate line, which will be further described below.

FIG. 10 illustrates a gate output voltage outputted to some of gate lines of a display device according to an embodiment.

As in the previous embodiment, the gate-on voltage VGH may be applied to each of the gate lines GL1-GLn of the display device according to the embodiment. The gate-on voltage VGH may be gradually changed within one frame. In this manner, the gate-on voltage VGH may gradually increase and be applied to the gate lines GL1-GLn from one of the gate lines GL1-GLn having the shortest distance in which the gate signal is applied to one of the gate lines GL1-GLn having the longest distance in which the gate signal is applied.

In addition, the kickback voltage VKB may be applied to each of the gate lines GL1-GLn. The kickback voltage VKB may be gradually changed within one frame. In this manner, the kickback voltage VKB may gradually decrease and be applied to the gate lines GL1-GLn from one of the gate lines GL1-GLn having the shortest distance in which the gate signal is applied to one of the gate lines GL1-GLn having the longest distance in which the gate signal is applied.

In the present embodiment, the kickback time may be kept constant up to a predetermined gate line GL1-GLn, and then the kickback time may increase after the predetermined gate line GL1-GLn. In the present embodiment, the kickback time is kept constant up to the predetermined gate line GL1-GLn, and then, after the predetermined gate line GL1-GLn, the kickback time increases up to another predetermined gate line GL1-GLn, and then, after the another predetermined gate line GL1-GLn, the kickback time may again be kept constant. The kickback time at which the kickback voltage VKB is applied to each of the gate lines GL1-GLn may be determined by Equation 5 below.

$$t(i)=tref, i\le p$$

$$t(i)=(1\pm(i-p)\gamma)tref, p<i\le q$$

$$t(i)=(1\pm(q-p)\gamma)tref, i\ge q \quad \text{(Equation 5)}$$

(t(i): kickback time of i-th gate line, tref: reference time)

The kickback voltage VKB may be applied to the first gate line GL1 for the reference time (tref). The kickback voltage VKB may be applied to the second gate line GL2 and the third gate line GL3 for the reference time (tref). Similarly, the kickback voltage VKB may be applied to the p-th gate line for the reference time (tref) as in the first gate line GL1. That is, the kickback time may be constant from the first gate line GL1 to the p-th gate line.

The kickback voltage VKB may be applied to a (p+1)-th gate line for a longer time ((1+γ)tref) than the time for the p-th gate line. The kickback voltage VKB may be applied to a (p+2)-th gate line for a longer time ((1+2γ)tref) than the time for the (p+1)-th gate line. The kickback voltage VKB may be applied to a q-th gate line for a longer time ((1+(q-p)γ)tref) than the time for the (p+1)-th gate line. That is, the kickback time may gradually increase from the p-th gate line to the q-th gate line. The kickback voltage VKB may be applied to a (q+1)-th gate line for the same time as the time ((1+(q-p)γ)tref) for the q-th gate line. The kickback voltage VKB may be applied to the n-th gate line for the same time as the time ((1+(q-p)γ)tref) for the q-th gate line. That is, the kickback time may be constant from the q-th gate line to the n-th gate line GLn.

In contrast, the kickback voltage VKB may be applied to the (p+1)-th gate line for a shorter time ((1−γtref) than the time for the p-th gate line. The kickback voltage VKB may be applied to the (p+2)-th gate line for a shorter time ((1−2γ)tref) than the time for the (p+1)-th gate line. The kickback voltage VKB may be applied to the q-th gate line for a shorter time ((1-(q-p)γ)tref) than the time for the (p+1)-th gate line. That is, the kickback time may gradually decrease from the p-th gate line to the q-th gate line. The kickback voltage VKB may be applied to the (q+1)-th gate line for the same time as the time ((1-(q-p)γ)tref) for the q-th gate line. The kickback voltage VKB may be applied to the n-th gate line for the same time as the time ((1−(q-p)γ)tref) for the q-th gate line. That is, the kickback time may be constant from the q-th gate line to the n-th gate line GLn.

In Equation 5, γ may be any number which is greater than 0 and less than 1, p may be any number which is greater than 2 and less than q, and q may be greater than p and less than n. The values of γ, p, and q may be adjusted. The receiving portion 510 of the voltage provider 500 may receive, from the outside, the γ value related to the change amount of the kickback time, the p value indicating the number of the gate line at which the change of the kickback time starts, and the q value indicating the number of the gate line at which the change of the kickback time is stopped.

In the present embodiment, the gate output voltage is controlled from the first gate line GL1 to a predetermined gate line only by changing the kickback voltage VKB, and after the predetermined gate line, the gate output voltage is controlled up to another predetermined gate line by changing the kickback time together with the change of the kickback voltage VKB. That is, when the gate output voltage does not sufficiently decrease, the gate output voltage may be adjusted to sufficiently decrease by increasing the kickback time after the predetermined gate line of GL1-GLn. In contrast, when the gate output voltage excessively decreases, the gate output voltage may be adjusted to decrease only as much as desired by decreasing the kickback time after the predetermined gate line of GL1-GLn. In addition, the gate output voltage may be controlled by changing the kickback voltage VKB while maintaining the changed kickback time after another predetermined gate line of GL1-GLn.

A change aspect of the kickback time described above is merely one example, and may be variously modified. For example, the kickback time may be increased from the first gate line GL1 to the predetermined gate lines GL1-GLn, and then the kickback time may be maintained from the predetermined gate lines GL1-GLn to the n-th gate line GLn. Furthermore, the kickback time for at least some of the gate lines GL1-GLn may be changed in various aspects.

Hereinafter, a display device according to an embodiment will be described with reference to FIG. 11.

Figure 11:
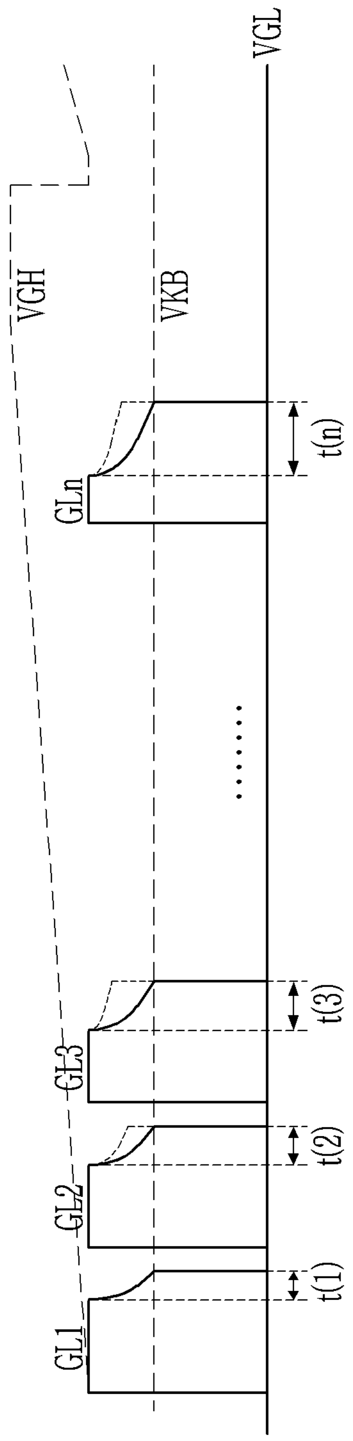
FIG. 11 illustrates a gate output voltage outputted to some of gate lines of a display device according to an embodiment.

Since many portions of the display device according to the embodiment of FIG. 11 are equal to those of the display device according to the embodiment of FIG. 8, a repeated description thereof will be omitted. The present embodiment is different from the previous embodiment in that the kickback voltages applied to the plurality of gate lines are the same, which will be described below.

FIG. 11 illustrates a gate output voltage outputted to some of gate lines of a display device according to an embodiment.

As in the previous embodiment, the gate-on voltage VGH may be applied to each of the gate lines GL1-GLn of the display device according to the embodiment. The gate-on voltage VGH may be gradually changed within one frame. In this manner, the gate-on voltage VGH may be gradually increased and applied to the gate lines GL1-GLn from one of the gate lines GL1-GLn having the shortest distance in which the gate signal is applied to one of the gate lines GL1-GLn having the longest distance in which the gate signal is applied.

In addition, the kickback voltage VKB may be applied to each of the gate lines GL1-GLn of the display device according to the embodiment. The time in which the kickback voltage VKB is applied to each of the gate lines GL1-GLn may be different. For example, the kickback time may gradually increase or decrease from the first gate line GL1 to the n-th gate line GLn. However, this is merely an example, and a change aspect of the kickback time may be variously changed. For some of the gate lines GL1-GLn, the kickback time may be kept constant. For example, the kickback time may be kept constant, and then the kickback time may gradually increase from a gate signal applied to a predetermined gate line of GL1-GLn. Alternatively, the kickback time may be kept constant, the kickback time may increase from a predetermined gate line of GL1 to GLn, and then the kickback time may be again kept constant from another predetermined gate line of GL1-GLn. Furthermore, the kickback time for at least some of the gate lines GL1-GLn may be changed in various aspects. In this manner, a change ratio of the kickback voltage VKB may be adjusted. In addition, a point at which the kickback voltage VKB is changed, a point at which it is maintained, and the like, may be adjusted.

In the previous embodiment, the kickback voltage VKB may be gradually changed within one frame. In the present embodiment, the same kickback voltage VKB may be applied to each of the gate lines GL1-GLn. The kickback voltage VKB applied to the first gate line GL1 may be equal to the kickback voltage VKB applied to the second gate line GL2. The kickback voltage VKB applied to the n-th gate line GLn may be the same as the kickback voltage VKB applied to the first gate line GL1.

In the present embodiment, when the gate output voltage does not sufficiently decrease as shown by a dotted line, by changing the kickback time for applying the kickback voltage VKB, the gate output voltage may be adjusted so as to sufficiently decrease, as shown by a solid line. That is, while the kickback voltage VKB applied to each of the gate lines GL1-GLn is kept constant, the gate output voltage may be adjusted to be a desired value by changing the kickback time.

Hereinafter, a display device according to an embodiment will be described with reference to FIG. 12.

Figure 12:
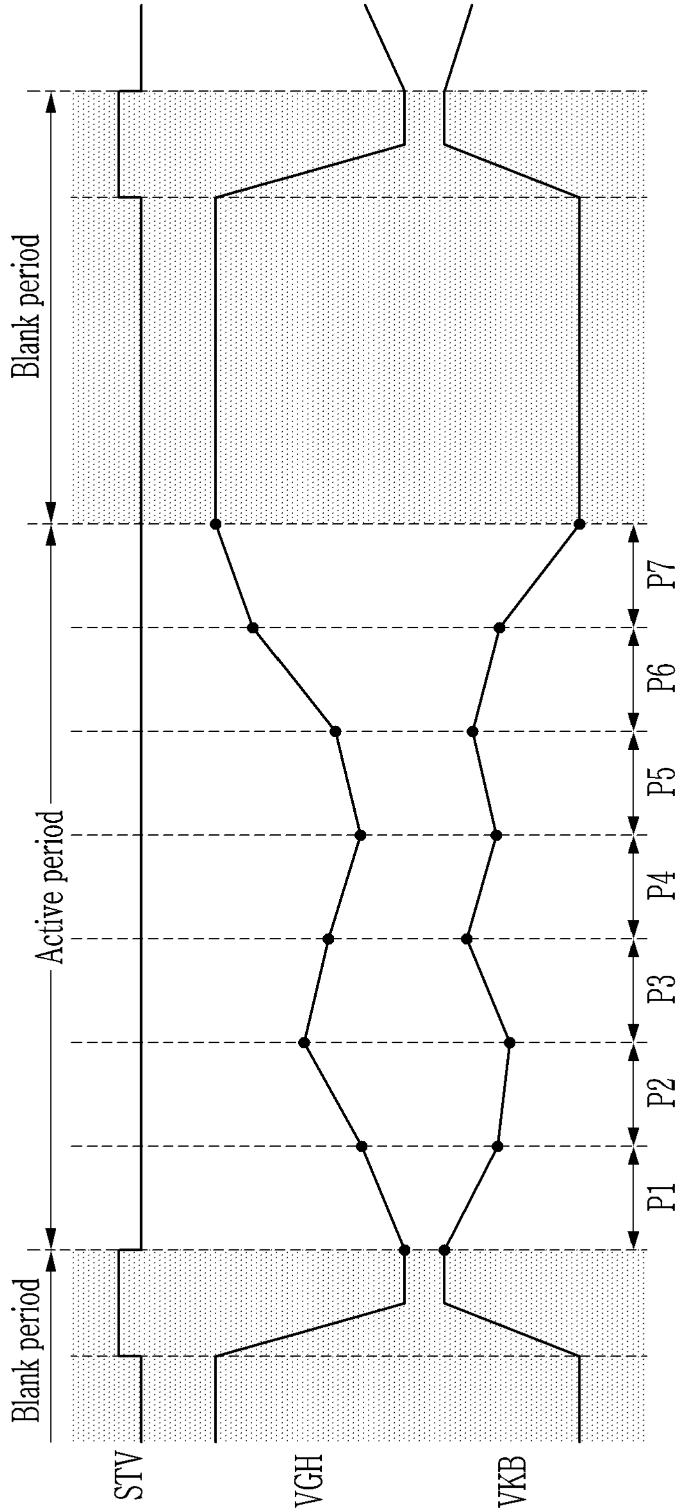
FIG. 12 illustrates a timing diagram of a gate signal generated in a display device according to an embodiment.

Since many portions of the display device according to the embodiment of FIG. 12 are equal to those of the display device according to the embodiment of FIG. 1 to FIG. 4, a repeated description thereof will be omitted. The present embodiment differs from the previous embodiment in that the gate line is divided into a plurality of sections to adjust the gate-on voltage and the kickback voltage at a boundary point of each section, which will be further described below.

FIG. 12 illustrates a timing diagram of a gate signal generated in a display device according to an embodiment.

As in the previous embodiment, the gate-on voltage VGH may be applied to each of the gate lines GL1-GLn of the display device according to the embodiment. In the present embodiment, the gate-on voltage VGH may be adjusted for each section by dividing the plurality of gate lines GL1-GLn into several sections. For example, the gate lines GL1 and GLn may be divided into a first section P1, a second section P2, a third section P3, a fourth section P4, a fifth section P5, a sixth section P6, and a seventh section P7. The gate-on voltage VGH applied to the first gate line GL1, which is a start point of the first section P1, and the gate-on voltage VGH applied to a gate line disposed at a boundary between the first section P1 and the second section P2, may be set. The gate-on voltage VGH in the first section P1 may be gradually changed from the gate-on voltage VGH applied to the first gate line GL1, which is the start point of the first section P1, to the gate-on voltage VGH applied to the gate line disposed at a boundary between the first section P1 and the second section P2. The gate-on voltage VGH applied to the gate line disposed at a boundary between the second section P2 and the third section P3 may be set. The gate-on voltage VGH in the second section P2 may be gradually changed from the gate-on voltage VGH applied to the gate line disposed the boundary between the first section P1 and the second section P3 to the gate-on voltage VGH applied to the gate line disposed at a boundary between the second section P2 and the third section P3. Similarly, the gate-on voltages VGH that are applied to the gate lines disposed at a boundary point between the third section P3 and the fourth section P4, at a boundary point between the fourth section P4 and the fifth section P5, at a boundary point between the fifth section P5 and the sixth section P6, at a boundary point between the sixth section P6 and the seventh section P7, and at an end point of the seventh section P7, may be set. In addition, the gate-on voltages VGH in the third section P3, the fourth section P4, the fifth section P5, the sixth section P6, and the seventh section P7 may be changed from the gate-on voltage VGH at a start point of each section to the gate-on voltage VGH at an end point. Within each section, the gate-on voltage VGH may gradually increase or decrease.

In addition, the kickback voltage VKB may be applied to each of the gate lines GL1-GLn. The kickback voltage VKB may be adjusted for each section by dividing the plurality of gate lines GL1-GLn into several sections. For example, the gate lines GL1 and GLn may be divided into the first section P1, the second section P2, the third section P3, the fourth section P4, the fifth section P5, the sixth section P6, and the seventh section P7. The kickback voltage VKB applied to the first gate line GL1, which is a start point of the first section P1, and the kickback voltage VKB applied to a gate line disposed at a boundary between the first section P1 and the second section P2, may be set. The kickback voltage VKB in the first section P1 may be gradually changed from the kickback voltage VKB applied to the first gate line GL1, which is the start point of the first section P1, to the kickback voltage VKB applied to the gate line disposed at a boundary point between the first section P1 and the second section P2. The kickback voltage VKB applied to the gate line disposed at a boundary between the second section P2 and the third section P3 may be set. The kickback voltage VKB in the second section P2 may be gradually changed from the kickback voltage VKB applied to the gate line disposed the boundary between the first section P1 and the second section P3 to the kickback voltage VKB applied to the gate line disposed a boundary between the second section P2 and the third section P3. Similarly, the kickback voltages VKB that are applied to the gate lines disposed at a boundary point between the third section P3 and the fourth section P4, at a boundary point between the fourth section P4 and the fifth section P5, at a boundary point between the fifth section P5 and the sixth section P6, at a boundary point between the sixth section P6 and the seventh section P7, and at an end point of the seventh section P7, may be set. In addition, the kickback voltage VKB in the third section P3, the fourth section P4, the fifth section P5, the sixth section P6, and the seventh section P7 may be changed from the kickback voltage VKB at a start point of each section to the kickback voltage VKB at an end point. Within each section, the kickback voltage VKB may gradually increase or decrease.

The receiving portion 510 of the voltage provider 500 receives, from the outside, the gate-on voltages VGH and the kickback voltages VKB at the start point of the first section P1, at the end point of the seventh section P7, and at the boundary points of the respective sections P1-P7. The gate-on voltage VGH and the kickback voltage VKB in each section may also be determined by the received voltage. As such, a desired gate output value may be controlled by adjusting the gate-on voltage VGH and the kickback voltage VKB for each section.

It is described above that the gate lines GL1-GLn are divided into seven sections, but this is merely an example, and the present disclosure may be variously changed. For example, approximately, 2160 of the gate lines GL1-GLn may be formed, and the gate lines GL1-GLn may be divided into eight sections and each section may include 270 gate lines GL1-GLn. The number of gate lines GL1-GLn may be variously changed, and the number of sections dividing the gate lines GL1-GLn may also be variously changed as well. In addition, each section may include the same number of gate lines GL1-GLn or may include different numbers of gate lines GL1-GLn.

While this disclosure has been described in connection with what is presently considered to be practical embodiments, it is to be understood that the disclosure is not limited to the disclosed embodiments, but, on the contrary, is intended to cover various modifications and equivalent arrangements included within the spirit and scope of the appended claims.

DESCRIPTION OF SYMBOLS

100: display panel
200: gate driver
300: data driver
400: signal controller
500: voltage provider
510: receiving portion
530: voltage generating portion
550: outputting portion

What is claimed is:

1. A display device comprising:

a display panel including a plurality of pixels, a plurality of gate lines, a plurality of data lines connected to the plurality of pixels, and a gate driver; and a circuit board comprising a voltage provider and a signal channel connecting the voltage provider to the gate driver, wherein the gate driver receives, through the signal channel, a gate-on voltage that generally increases in one frame and a kickback voltage that gradually decreases in one frame from the voltage provider, and applies the gate-on voltage and the kickback voltage to the plurality of gate lines, wherein a change amount of the gate-on voltage within one frame is proportional to a change amount of the kickback voltage within one frame, a ratio of the change amount of the kickback voltage within one frame to the change amount of the gate-on voltage within one frame is adjustable, a kickback time in which the kickback voltage is applied is different for at least one of the plurality of gate lines, and the kickback time is defined by $$t(i)=(1\pm(i-1)\gamma)tref,$$

(t(i): kickback time of i-th gate line, tref: reference time, and γ: any number between 0 and 1).

2. The display device of claim 1, wherein the change amount of the gate-on voltage within one frame is constant.

3. The display device of claim 1, wherein the change amount of the kickback voltage within one frame is constant.

4. The display device of claim 1, wherein the plurality of gate lines include a first gate line to an n-th gate line, the gate-on voltage, which gradually increases, is applied from the first gate line to the n-th gate line within one frame, and the kickback voltage, which gradually decreases, is applied from the first gate line to the n-th gate line within one frame.

5. The display device of claim 1, wherein the plurality of gate lines include a first gate line to an n-th gate line, the gate-on voltage, which gradually decreases, is applied from the first gate line to the n-th gate line within one frame, and the kickback voltage, which gradually increases, is applied from the first gate line to the n-th gate line within one frame.

6. The display device of claim 1, wherein the plurality of gate lines include a first gate line to an n-th gate line, and the kickback time gradually increases or decreases from the first gate line to the n-th gate line.

7. The display device of claim 6, wherein a change amount of the kickback time is adjustable.

8. The display device of claim 1, wherein the plurality of gate lines include a first gate line to an n-th gate line, and the kickback time is constantly maintained from the first gate line to a p-th gate line, and the kickback time gradually increases or decreases from the p-th gate line to the n-th gate line.

9. The display device of claim 8, wherein the change amount of the kickback time and a value of p are adjustable.

10. The display device of claim 1, wherein the plurality of gate lines include a first gate line to an n-th gate line, the kickback time is constantly maintained from the first gate line to a p-th gate line, and the kickback time gradually increases or decreases from the p-th gate line to a q-th gate line.

11. The display device of claim 10, wherein the change amount of the kickback time and values of p and q are adjustable.

* * * * *